(12) United States Patent
Xiao et al.

(10) Patent No.: US 11,417,888 B2
(45) Date of Patent: Aug. 16, 2022

(54) ELECTRODE ADDITIVES AND COATINGS FOR MINIMIZING CATHODE TRANSITION METAL DISSOLUTION

(71) Applicant: GM GLOBAL TECHNOLOGY OPERATIONS LLC, Detroit, MI (US)

(72) Inventors: Xingcheng Xiao, Troy, MI (US); Jin Liu, Sterling Heights, MI (US); Jiagang Xu, Warren, MI (US); Mei Cai, Bloomfield Hills, MI (US); Sherman H. Zeng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 16/573,605

(22) Filed: Sep. 17, 2019

(65) Prior Publication Data

US 2021/0083294 A1    Mar. 18, 2021

(51) Int. Cl.
*H01M 4/62* (2006.01)
*H01M 4/04* (2006.01)
*H01M 4/131* (2010.01)
*H01M 10/0525* (2010.01)
*H01M 4/485* (2010.01)
*H01M 4/60* (2006.01)
*H01M 4/137* (2010.01)
(Continued)

(52) U.S. Cl.
CPC ......... *H01M 4/628* (2013.01); *H01M 4/0404* (2013.01); *H01M 4/131* (2013.01); *H01M 4/137* (2013.01); *H01M 4/1391* (2013.01); *H01M 4/1399* (2013.01); *H01M 4/485* (2013.01); *H01M 4/602* (2013.01); *H01M 4/623* (2013.01); *H01M 10/0525* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 8,974,946 B2 | 3/2015 | Cai et al. |
| 8,999,584 B2 | 4/2015 | Jiang et al. |

(Continued)

FOREIGN PATENT DOCUMENTS

CN    112531138 A    3/2021

OTHER PUBLICATIONS

Xiao, Xingcheng et al., U.S. Appl. No. 16/445,610, filed Jun. 19, 2019 entitled, "Ceramic-Coated Separators for Lithium-Contianing Electrochemical Cells and Methods of Making the Same," 47 pages.

(Continued)

*Primary Examiner* — Tracy M Dove
(74) *Attorney, Agent, or Firm* — Harness, Dickey & Pierce, P.L.C.

(57) ABSTRACT

An electrode including an electrode active material and a ceramic hydrofluoric acid (HF) scavenger is provided. The ceramic hydrofluoric acid (HF) scavenger includes $M_2SiO_3$, $MAlO_2$, $M_2O$—$Al_2O_3$—$SiO_2$, or combinations thereof, where M is lithium (Li), sodium (Na), or combinations thereof. Methods of making the electrode are also provided.

10 Claims, 4 Drawing Sheets

(51) Int. Cl.
H01M 4/1391 (2010.01)
H01M 4/1399 (2010.01)
H01M 4/02 (2006.01)

(56) References Cited

U.S. PATENT DOCUMENTS

| | | | |
|---|---|---|---|
| 9,028,565 | B2 | 5/2015 | Huang |
| 9,093,705 | B2 | 7/2015 | Xiao et al. |
| 9,123,939 | B2 | 9/2015 | Xiao et al. |
| 9,142,830 | B2 | 9/2015 | Xiao et al. |
| 9,153,819 | B2 | 10/2015 | Huang et al. |
| 9,160,036 | B2 | 10/2015 | Yang et al. |
| 9,350,046 | B2 | 5/2016 | Huang |
| 9,362,551 | B2 | 6/2016 | Sachdev et al. |
| 9,362,552 | B2 | 6/2016 | Sohn et al. |
| 9,455,430 | B2 | 9/2016 | Huang et al. |
| 10,062,898 | B2 | 8/2018 | Xiao |
| 2004/0191633 | A1* | 9/2004 | Johnson .............. H01M 10/052 429/246 |
| 2011/0250509 | A1* | 10/2011 | Yamaguchi ......... H01M 10/052 429/339 |
| 2012/0229096 | A1 | 9/2012 | Nazri |
| 2012/0231321 | A1 | 9/2012 | Huang et al. |
| 2013/0284338 | A1 | 10/2013 | Xiao et al. |
| 2014/0272526 | A1* | 9/2014 | Huang .................. H01M 50/44 429/246 |
| 2014/0272558 | A1 | 9/2014 | Xiao et al. |
| 2017/0229742 | A1* | 8/2017 | Aykol ................... H01M 4/505 |
| 2018/0254449 | A1 | 9/2018 | Xiao et al. |
| 2018/0254531 | A1 | 9/2018 | Xiao et al. |
| 2020/0227622 | A1* | 7/2020 | Matus ................. H01L 41/0472 |
| 2021/0143481 | A1* | 5/2021 | Park ................... H01M 50/431 |
| 2021/0159493 | A1* | 5/2021 | Xiao ................... H01M 4/1395 |

OTHER PUBLICATIONS

Vetter, J. et al., "Ageing mechanisms in lithium-ion batteries," Journal of Power Sources, 147 (2005), pp. 269-281 (Published online: Mar. 14, 2005); DOI: 10.1016/j.jpowsour.2005.01.006.

* cited by examiner

ELECTRODE ADDITIVES AND COATINGS FOR MINIMIZING CATHODE TRANSITION METAL DISSOLUTION

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. In electrochemical cells, such as in lithium-ion batteries, one of the two electrodes serves as a positive electrode or cathode, and the other electrode serves as a negative electrode or anode. Conventional rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte disposed between solid-state electrodes, the solid-state electrolyte physically separates the electrodes so that a distinct separator is not required.

Lithium-ion batteries often include cathode active materials that include transition metals (e.g., $LiMnO_2$) and a liquid electrolyte that includes, for example, $LiPF_6$ in a carbonate-based organic solvent. However, especially at elevated temperatures of from about 40° C. to about 60° C., water in the electrolyte may react with the $LiPF_6$ to generate HF, LiF, and $H_3PO_4$. The HF can react with the cathode active material, causing the release of transition metal ions (e.g., $Mn^{2+}$). This phenomenon of transition metal ion release is known as transition metal dissolution. As a result of transition metal dissolution, the transition metal ions can precipitate back onto the cathode or migrate to and become deposited on an anode, resulting in cathode active material loss, fading capacity, damage to a solid electrolyte interphase layer, and/or blocking of lithium intercalation into the negative electrode. Therefore, separators have been coated with ceramic materials $SiO_2$ and $Al_2O_3$ for the purpose of scavenging HF. The $SiO_2$ and $Al_2O_3$ react with the HF to generate the hydrates $SiF_4 \cdot XH_2O$ and $AlF_3 \cdot XH_2O$, respectively. However, at elevated temperatures, the water molecules release from the hydrates, promoting further hydrolysis of $LIPF_6$. Accordingly, HF scavengers that do not release water at elevated temperatures are desirable.

SUMMARY

This section provides a general summary of the disclosure, and is not a comprehensive disclosure of its full scope or all of its features.

In various aspects, the current technology provides an electrode including an electrode active material and a ceramic hydrofluoric acid (HF) scavenger, wherein the ceramic HF scavenger includes $M_2SiO_3$, $MAlO_2$, $M_2O$—$Al_2O_3$—$SiO_2$, or combinations thereof, where M is lithium (Li), sodium (Na), or combinations thereof.

In one aspect, the ceramic HF scavenger includes $Li_2SiO_3$, $LiAlO_2$, $Li_2O$—$Al_2O_3$—$SiO_2$, or combinations thereof.

In one aspect, the ceramic HF scavenger includes $Na_2SiO_3$, $NaAlO_2$, $Na_2O$—$Al_2O_3$—$SiO_2$, or combinations thereof.

In one aspect, the electrode active material is a cathode active material.

In one aspect, the cathode active material is a transition metal oxide or a transition metal polyanion.

In one aspect, the ceramic HF scavenger is embedded within the electrode active material.

In one aspect, the ceramic HF scavenger is in the form of a coating that coats at least a portion of the electrode active material.

In one aspect, the coating has a thickness of greater than or equal to about 1 μm to less than or equal to about 20 μm.

In one aspect, the electrode is an anode, the electrode active material is an anode active material, and the ceramic HF scavenger is in the form of a coating that coats at least a portion of the anode active material.

In one aspect, the electrode is located in a battery that cycles Li or Na ions and that includes a liquid electrolyte that is capable of reacting with water to form HF.

In various aspects, the current technology further provides a method of fabricating an electrode that scavenges hydrofluoric acid (HF), the method including mixing a ceramic hydrofluoric acid (HF) scavenger powder into a solution including a binder dissolved in a solvent to form a slurry having a viscosity of greater than or equal to about 5000 cps to less than or equal to about 6000 cps, the ceramic HF scavenger being $M_2SiO_3$, $MAlO_2$, $M_2O$—$Al_2O_3$—$SiO_2$, or combinations thereof, where M is lithium (Li), sodium (Na), or combinations thereof; casting a continuous layer of the slurry onto a surface of an electrode; removing the solvent from the slurry to form a coating on the electrode, wherein the coating has a first porosity and scavenges HF.

In one aspect, the solution including the binder dissolved in the solvent includes 6 wt. % polyvinylidene fluoride (PVDF) dissolved in N-Methyl-2-pyrrolidone (NMP).

In one aspect, the continuous layer of the slurry has a thickness of greater than or equal to about 1 μm to less than or equal to about 20 μm.

In one aspect, the slurry includes the ceramic HF scavenger powder at a concentration of greater than or equal to about 70 wt. % to less than or equal to about 95 wt. %.

In one aspect, the method further includes calendaring the coated electrode to generate a second porosity in the coating, the second porosity being lower than the first porosity.

In various aspects, the current technology also provides a method of fabricating an electrode that scavenges hydrofluoric acid (HF), the method including mixing a powder of a ceramic hydrofluoric acid (HF) scavenger into a solution including a binder dissolved in a solvent to form a slurry having a viscosity of greater than or equal to about 200 cps to less than or equal to about 1000 cps, the ceramic HF scavenger being $M_2SiO_3$, $MAlO_2$, $M_2O$—$Al_2O_3$—$SiO_2$, or combinations thereof, where M is lithium (Li), sodium (Na), or combinations thereof; mixing a cathode active material into the slurry until the slurry has a viscosity of greater than or equal to about 4000 cps to less than or equal to about 6000 cps; casting a continuous layer of the slurry onto a current collector; and removing the solvent from the slurry to generate the electrode that scavenges HF, the electrode having a first porosity, wherein the electrode that scavenges HF includes the ceramic HF scavenger embedded within the cathode active material.

In one aspect, the solution including the binder dissolved in the solvent includes 6 wt. % polyvinylidene fluoride (PVDF) dissolved in N-Methyl-2-pyrrolidone (NMP).

In one aspect, the solution further includes carbon black.

In one aspect, the slurry includes the cathode active material at a concentration of greater than or equal to about 70 wt. % to less than or equal to about 95 wt. %.

In one aspect, the method further includes calendaring the electrode to generate a second porosity in the electrode, the second porosity being lower than the first porosity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology provides ceramic hydrofluoric acid (HF) scavengers that can be embedded into electrodes or included in electrode coatings. The ceramic HF scavengers trap protons, for example, from HF, without forming hydrates that can be released at elevated temperatures. As a result, transition metal dissolution is prevented, inhibited, relatively decreased, or minimized. The current technology also provides methods of making the ceramic HF scavengers and methods of fabricating electrodes with the ceramic HF scavengers.

Figure 1:
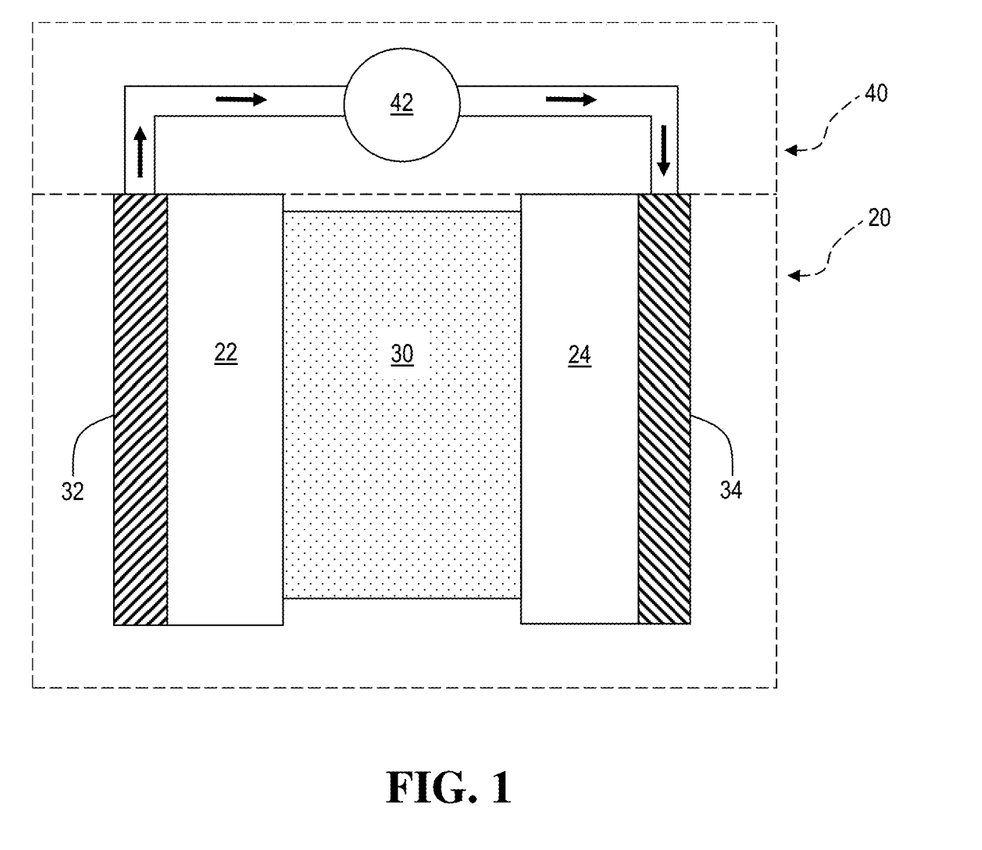
FIG. 1 is an illustration of an electrochemical cell in accordance with various aspects of the current technology.

An exemplary schematic illustration of an electrochemical cell 20 (also referred to as the battery, which comprises at least one electrochemical cell) that cycles lithium ions is shown in FIG. 1. Unless specifically indicated otherwise, the term "ions" as used herein refers to lithium ions or sodium ions. For example, an electrochemical cell that cycles sodium ions has similar components as the lithium-ion battery 20, but replaces the lithium and lithium ions with sodium and sodium ions in corresponding components. The battery 20 includes a negative electrode (i.e., an anode) 22, a positive electrode (i.e., a cathode) 24, and a separator 30 (e.g., a microporous polymeric separator) disposed between the two electrodes 22, 24. An electrolyte is present throughout the separator 30 and, optionally, in the negative electrode 22 and positive electrode 24. A negative electrode current collector 32 may be positioned at or near the negative electrode 22, and a positive electrode current collector 34 may be positioned at or near the positive electrode 24. While not shown, the negative electrode current collector 32 and the positive electrode current collector 34 may be coated on one or both sides, as is known in the art. In certain aspects, the current collectors 32, 34 may be coated with an electrode active material/electrode layer on both sides. The negative electrode current collector 32 and positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34). Composite electrodes can also include a binder, such as polyvinylidene fluoride (PVDF), and/or an electrically conductive carbon, such as carbon black or carbon nanotubes, which is dispersed throughout materials that define the negative electrode 22 and/or the positive electrode 24.

The battery 20 can generate an electric current (indicated by the block arrows) during discharge by way of reversible electrochemical reactions that occur when the external circuit 40 is closed (to connect the negative electrode 22 and the positive electrode 24) and the negative electrode 22 contains a relatively greater quantity of lithium than the positive electrode. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte solution contained in the separator 30 towards the positive electrode 24. The electrons flow through the external circuit 40 and the lithium ions migrate across the separator 30 containing the electrolyte solution to form intercalated lithium at the positive electrode 24. The electric current passing through the external circuit 40 can be harnessed and directed through the load device 42 until the intercalated lithium in the negative electrode 22 is depleted and the capacity of the battery 20 is diminished.

The battery 20 can be charged or re-energized at any time by connecting an external power source to the battery 20 to reverse the electrochemical reactions that occur during battery discharge. The connection of an external electrical energy source to the battery 20 compels the otherwise non-spontaneous oxidation of intercalated lithium at the positive electrode 24 to produce electrons and ions. The electrons, which flow back towards the negative electrode 22 through the external circuit 40, and the ions, which are carried by the electrolyte solution across the separator 30 back towards the negative electrode 22, reunite at the negative electrode 22 and replenish it with lithium for use during the next battery discharge event. As such, each complete discharging event followed by a complete charging event is considered to be a cycle, where ions are cycled between the positive electrode 24 and the negative electrode 22.

The external power source that may be used to charge the battery 20 may vary depending on size, construction, and particular end-use of the battery 20. Some notable and exemplary external power sources include, but are not limited to, AC power sources, such as AC wall outlets and motor vehicle alternators, and AC-DC converters connected to an AC electrical power grid through a wall outlet and a motor vehicle alternator.

In many ion battery configurations, each of the negative electrode current collector 32, the negative electrode 22, the separator 30, the positive electrode 24, and the positive electrode current collector 34 are prepared as relatively thin layers (for example, from several microns to a fraction of a millimeter or less in thickness) and assembled in layers connected in electrical parallel arrangement to provide a suitable electrical energy and power package. In various other instances, the battery 20 may include electrodes 22, 24 that are connected in series. Further, the separator 30 operates as an electrical insulator by being sandwiched between the negative electrode 22 and the positive electrode 24 to prevent physical contact and, thus, the occurrence of a short circuit. In addition to providing a physical barrier between the electrodes 22, 24, the separator 30 acts like a sponge that contains the electrolyte solution in a network of open pores during the cycling of lithium ions to facilitate functioning of the battery 20.

The battery 20 can include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 30. As noted above, the size and shape of the battery 20 may vary depending on the particular application for which it is designed. Battery-powered vehicles and hand-held consumer electronic devices, for instance, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to the load device 42 that is part of the external circuit 40. The load device 42 may be powered by the electric current passing through the external circuit 40 when the battery 20 is discharging. While the electrical load device 42 may be any number of known electrically powered devices, a few examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

Any appropriate electrolyte, whether in solid form (such as in a solid-state electrochemical cell) or solution, capable of conducting lithium ions between the negative electrode 22 and the positive electrode 24 may be used in the lithium-ion battery 20. In certain aspects, the electrolyte solution may be a nonaqueous liquid electrolyte solution that includes a lithium salt dissolved in an organic solvent or a mixture of organic solvents. Numerous conventional non-aqueous liquid electrolyte solutions may be employed in the lithium-ion battery 20. A non-limiting list of lithium salts that may be dissolved in an organic solvent to form the nonaqueous liquid electrolyte solution includes $LiPF_6$, LiFSi, $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $Li(CF_3SO_2)_2N$, and combinations thereof. These and other similar lithium salts may be dissolved in a variety of organic solvents, including, but not limited to, various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethyl methyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof. However, as discussed above, some lithium salts react with water, i.e., undergo hydrolysis, which results in the formation of hydrofluoric acid (HF). Such lithium salts include $LiPF_6$, LiFSi, $LiBF_4$, $LiAsF_6$, $LiCF_3SO_3$, $LiN(CF_3SO_2)_2$, $Li(CF_3SO_2)_2N$, and combinations thereof. Therefore, ceramic HF scavengers are included in or on negative or positive electrodes 22, 24, as discussed further below.

The separator 30 operates as both an electrical insulator and a mechanical support. In one embodiment, a microporous polymeric separator 30 comprises a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, multiple discrete layers of similar or dissimilar polyolefins may be assembled to form the microporous polymer separator 30. The polyolefins may be homopolymers (derived from a single monomer constituent) or heteropolymers (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), a blend of PE and PP, or multi-layered structured porous films of PE and/or PP. The microporous polymer separator 30 may also comprise other polymers in addition to the polyolefin, such as, but not limited to, polyethylene terephthalate (PET), polyvinylidene fluoride (PVDF), and/or a polyamide. Furthermore, the porous separator 30 may be mixed with a ceramic material or its surface may be coated in a ceramic material. For example, a ceramic coating may include alumina ($Al_2O_3$), silicon dioxide ($SiO_2$), titania ($TiO_2$), or combinations thereof. Commercially available polyolefin porous membranes include CELGARD® 2500 (a monolayer polypropylene separator) and CELGARD® 2320 (a trilayer polypropylene/polyethylene/polypropylene separator), both available from Celgard, LLC. The polyolefin layer and any other optional polymer layers may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such microporous polymer separators 30.

The negative electrode 22 may be formed from a lithium host material that is capable of functioning as a negative terminal of a lithium-ion battery. The negative electrode 22 may thus include the electrode active material and, optionally, another electrically conductive material, as well as one or more polymeric binder materials to structurally hold the lithium host material together. In certain variations, the negative electrode active material may comprise lithium, such as, for example, lithium metal. In certain variations, the negative electrode 22 is a film or layer formed of lithium metal or an alloy of lithium. In certain variations, the negative electrode active material comprises carbon-based materials, such as graphite or silicon and/or silicon-based alloys.

Such negative electrode active materials may be optionally intermingled with an electronically conducting material that provides an electron conduction path and/or at least one polymeric binder material that improves the structural integrity of the negative electrode 22. By way of non-limiting example, the negative electrode 22 may include an active material including lithium metal particles (e.g., lithium foil) intermingled with a binder material selected from the group consisting of polyvinylidene fluoride (PVDF), polytetrafluoroethylene (PTFE), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof. Additional suitable electrically conductive materials may include carbon-based materials a or conductive polymer. Carbon-based materials may include, by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode current collector 32 may be formed from copper (Cu) or any other appropriate electrically conductive material known to those of skill in the art.

The positive electrode 24 may be formed from a lithium-based or sodium-based active material that can sufficiently undergo lithium/sodium intercalation and deintercalation or alloying and dealloying, while functioning as the positive terminal of the battery 20. In various aspects, the positive electrode 24 includes a positive electrode active material in spinel or layered-oxide phases, the positive electrode active material comprising lithium/sodium transition metal oxides or lithium/sodium transition metal polyanions. Non-limiting examples of transition metal oxides include lithium cobalt oxide (LCO, $LiCoO_2$); lithium manganese oxide (LMO, $LiMn_2O_4$); $Li_{1+x}M_{2-x}O_2$, where $0 \leq x \leq 1$ and M is a transition metal (e.g., Fe, Ni, Mn, Co, Ti, V, and combinations thereof); lithium nickel cobalt manganese oxide (NMC/NCM, LiNi-CoMnO$_2$), including $LiNi_xMn_yCo_{1-x-y}O_2$, where $0 \leq x \leq 1$ and $0 \leq y \leq 1$; lithium nickel cobalt aluminum oxide (NCA, LiNi-CoAlO$_2$); lithium nickel manganese spinel (LNMO, $LiNi_{0.5}Mn_{1.5}O_4$); and $LiNi_xMn_{1-x}O_2$, where $0 \leq x \leq 1$. Non-limiting examples of transition metal polyanions include phosphates, such as $LiMPO_4$, where M is Fe, Mn, Co, Ni, Zn, V, or combinations thereof, $LiV_2(PO_4)_3$, and $Li_3Fe_3(PO_4)_4$; fluorophosphates, such as $Li_2MPO_4F$, where M is Fe, Mn, Co, Ni, Zn, V, or combinations thereof, $Li_2FePO_4F$, and $Li_3V_2(PO_4)F_3$; pyrophosphates, such as $Li_2MP_2O_7$, where M is Fe, Mn, Co, Ni, Zn, V, or combinations thereof; silicates, such as $Li_2MSiO_4$, where M is Fe, Mn, Co, Ni, Zn, V, or combinations thereof; carbonophosphates, such as $Li_3MCO_3PO_4$ where M is Fe, Mn, Co, Ni, Zn, V, or combinations thereof; sulfates, such as $Li_2M(SO_4)_2$, where M is Fe, Mn, Co, Ni, Zn, V, or combinations thereof; and borates, such as $LiMBO_3$, where M is Fe, Mn, Co, Ni, Zn, V, or combinations thereof. The lithium of the previous examples can be exchanged with sodium for sodium-ion batteries. In certain aspects, the positive solid-state electrode active particles may be coated (for example, by $Al_2O_3$) and/or the positive electrode active material may be doped (for example, by magnesium (Mg)).

The positive electrode active materials may be powder compositions. The positive electrode active materials may be intermingled with an optional electrically conductive material (e.g., electrically-conductive particles) and a polymeric binder. The binder may both hold together the positive electrode active material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene fluoride (PVDF), lithium polyacrylate (LiPAA), sodium polyacrylate (NaPAA), sodium alginate, lithium alginate, or combinations thereof.

The positive electrode active material loading in the binder can be large, such as greater than about 80 wt. %. For example, the binder can be present at a level of greater than or equal to about 1 wt. % to less than or equal to about 20 wt. %, optionally greater than or equal to about 1 wt. % to less than or equal to about 10 wt. %, optionally greater than or equal to about 1 wt. % to less than or equal to about 8 wt. %, optionally greater than or equal to about 1 wt. % to less than or equal to about 7 wt. %, optionally greater than or equal to about 1 wt. % to less than or equal to about 6 wt. %, optionally greater than or equal to about 1 wt. % to less than or equal to about 5 wt. %, or optionally greater than or equal to about 1 wt. % to less than or equal to about 3 wt. %.

Electrically conductive materials may include graphite, other carbon-based materials, conductive metals, or conductive polymer particles. Carbon-based materials may include, by way of non-limiting example, particles of KETCHEN™ black, DENKA™ black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain aspects, mixtures of electrically conductive materials may be used.

In certain variations, the positive electrode 24 includes the electrically-conductive material in an amount less than or equal to about 15 wt. %, optionally less than or equal to about 10 wt. %, or optionally greater than or equal to about 0.5 wt. % to less than or equal to about 8 wt. %. While the supplemental electrically conductive materials may be described as powders, these materials lose their powder-like character following incorporation into the electrode, where the associated particles of the supplemental electrically conductive materials become a component of the resulting electrode structure.

As discussed above, some liquid electrolytes are capable of reacting with water to form HF, especially at elevated temperatures. With cooling systems in place, the battery 20 typically operates within a normal temperature that is less than or equal to about 40° C., such as within a range of greater than or equal to about 25° C. to less than about 40° C. As used herein, "elevated temperatures" are temperatures that are greater than or equal to about 40° C., such as within a range of greater than or equal to about 40° C. to less than or equal to about 60° C. Such liquid electrolytes that hydrolyze to form HF at elevated temperatures include $LiPF_6$, LiFSi, $LiBF_4$, $LiAsF_6$, $LiCF_3SO_3$, $LiN(CF_3SO_2)_2$, $Li(CF_3SO_2)_2N$, and combinations thereof, as non-limiting examples. As discussed above, the HF can react with positive electrode active materials comprising at least one transition metal and cause transition metal dissolution. Although ceramic materials such as $SiO_2$ and $Al_2O_3$ have been used to scavenge HF and form the hydrates $SiF_4.XH_2O$ and $AlF_3.XH_2O$, respectively, at elevated temperatures, water molecules release from the hydrates, which can result in the formation of additional HF and cause transition metal dissolution. Accordingly, the current technology provides an electrode comprising an electrode active material and a ceramic HF scavenger, wherein the ceramic HF scavenger comprises $M_2SiO_3$, $MAlO_2$, $M_2O$—$Al_2O_3$—$SiO_2$, or combinations thereof, where M is Li, Na, or combinations thereof. Therefore, for batteries that cycle lithium ions, the ceramic HF scavenger comprises $Li_2SiO_3$, $LiAlO_2$, $Li_2O$—$Al_2O_3$—$SiO_2$, or combinations thereof, and for batteries that cycle sodium ions, the ceramic HF scavenger comprises $Na_2SiO_3$, $NaAlO_2$, $Na_2O$—$Al_2O_3$—$SiO_2$, or combinations thereof. The ceramic HF scavenger (or combination of scavengers) traps protons, for example, from HF, without forming hydrates that can be released at elevated temperatures. More particularly, for example, $Li_2SiO_3$ reacts with HF to form $LiHAl_2O_4$, which does not include a releasable water molecule. Similarly, $LiAlO_2$ reacts with HF to form $Li_xH_{4-x}SiO4$ (0≤x<4), which does not include a releasable water molecule, and $Li_2O$—$Al_2O_3$—$SiO_2$, reacts with HF to form $Li_xH_{7-x}SiAlO_7$ (0≤x<7), which does not include a releasable water molecule. The ceramic HF scavenger is embedded into a positive electrode, i.e., within a positive electrode active material, or included in an electrode coating for a positive electrode or, in certain embodiments discussed further below, for a negative electrode.

Methods of preparing the ceramic HF scavengers are described in U.S. patent application Ser. No. 16/445,610 filed on Jun. 19, 2019, which is incorporated herein by reference in its entirety. The methods include admixing a precursor zeolite-based powder with a solution, for example, an aqueous solution, comprising one or more of lithium hydroxide (LiOH) and lithium chloride (LiCl) to form a second, zeolite slurry. A weight ratio of the precursor zeolite to the solution may be greater than or equal to about 1 wt. % to less than or equal to about 10 wt. %, and a weight ratio of the lithium hydroxide to the solution may be greater than or equal to about 0.5 wt. % to less than or equal to about 5 wt. %. The precursor zeolite-based powder may include one or more zeolite materials selected from the group consisting of zeolite A, zeolite X, zeolite Y, zeolite L, ZSM-5, zeolite beta, mordenite, ferrierite, and combinations thereof. For example, the precursor zeolite may comprise a zeolite material such as zeolite Y. Zeolite Y has a ratio of silicon to aluminum of greater than or equal to about 1.5 to less than or equal to about 3 and a surface area of about 453 m²/g. In various aspects, the zeolite material may have an average particle size that is less than or equal to about 5 μm, and in certain variations, optionally less than or equal to about 1 μm. In certain variations, the precursor zeolite powder further comprises greater than or equal to about 1 wt. % to less than or equal to about 20 wt. % of sodium oxide ($NaO_2$). When the mixture is exposed to a temperature greater than or equal to about 30° C. to less than or equal to about 100° C., and in certain aspects, optionally about 60° C., for a time greater than or equal to about 6 hours to less than or equal to about 24 hours, and in certain aspects, optionally about 12 hours, the sodium oxide facilitates lithium-ion exchange between the lithium hydroxide and/or lithium chloride within the solution and the extra-framework cations and/or free ions within the zeolite material. In various instances, it is desirable that the zeolite material has a cumulative total concentration of sodium and hydrogen that is less than the lithium hydroxide concentration and/or lithium chloride concentration in the solution, so as to drive the ion exchange between the lithium ions and the sodium ions or protons. Such lithium-ion exchange results in the formation of one or more lithiated oxides, for example, a powder comprising one or more lithiated oxides. In certain variations, the lithiated oxides, such as $Li_2SiO_3$ and $LiAlO_2$, result from such lithium-ion exchange between the zeolite material and the lithium hydroxide and/or lithium chloride. In various aspects, the formed lithiated-oxide powder may be washed, for example, to remove residual lithium hydroxide and/or lithium chloride. Residual lithium hydroxide and/or lithium chloride may undesirably increase the moisture levels by reacting with carbon dioxide within the cell. The lithiated oxides may be washed using an aqueous liquid, such as water, for example. In certain variations the water may be, for example, distilled water, and in certain aspects, optionally deionized water. In various aspects, the lithiated-oxide powder may also be calcined at a temperature greater than or equal to about 200° C. to less than or equal to about 400° C., and in certain aspects, optionally about 400° C., for a time greater than or equal to about 2 hours to less than or equal to about 6 hours, and in certain aspects, optionally about 2 hours, to remove any adsorbed water.

Figure 2:
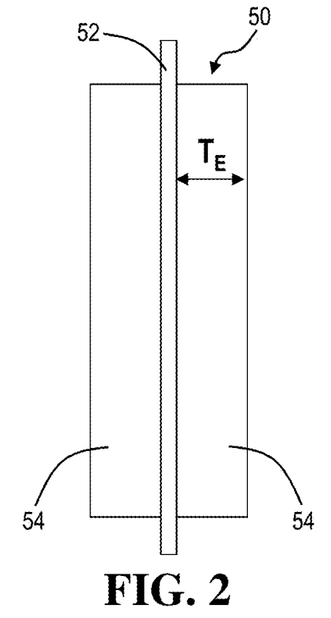
FIG. 2 is an illustration of an electrode that does not include a ceramic HF scavenger.

FIG. 2 shows an exemplary electrode 50 comprising a current collector 52 and an electrode active material 54 disposed on opposing sides of the current collector 52 that has a thickness $T_E$ of greater than or equal to about 1 μm to less than or equal to about 100 μm, such as a thickness of about 1 μm, about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, or about 100 μm. The electrode 50 is representative of both positive electrodes (e.g., cathodes in electrochemical cells) and negative electrodes (e.g., anodes in electrochemical cells). Therefore, the electrode active material can be either a positive electrode active material or a negative electrode active material. The electrode 50 does not comprise a ceramic HF scavenger in accordance with the current technology.

Figure 3:
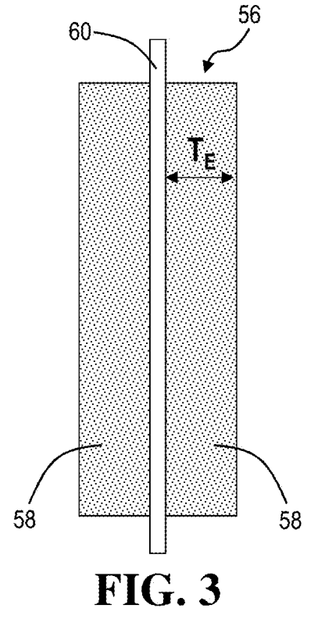
FIG. 3 is an illustration of an electrode having a ceramic HF scavenger embedded within an electrode active material in accordance with various aspects of the current technology.

FIG. 3 shows an electrode 56 comprising an electrode active material 58 and a ceramic HF scavenger, wherein the ceramic HF scavenger comprises $M_2SiO_3$, $MAlO_2$, $M_2O$—$Al_2O_3$—$SiO_2$, or combinations thereof, where M is Li, Na, or combinations thereof. The electrode active material 58 is disposed on opposing sides of a current collector 60 and has a thickness $T_E$ as described above. The electrode 56 can be either a cathode or an anode. As such, the electrode active material can be either a positive electrode (i.e., cathode in an electrochemical cell) active material or a negative electrode (i.e., anode in an electrochemical cell) active material. In various embodiments, the electrode active material 58 is a cathode active material comprising a transition metal oxide or a transition metal polyanion as discussed above. The ceramic HF scavenger is embedded within the electrode active material 58. Accordingly, when the electrode 56 is within an electrochemical cell or battery, which also includes a cathode comprising a transition metal oxide or a transition metal polyanion (which may be the electrode 56 itself) and an electrolyte that is capable of reacting with water to form HF, and HF is formed within the electrolyte, the ceramic HF scavenger incorporates the hydrogen atom from the HF. The HF is then incapable of reacting with the transition metal oxides or transition metal polyanions in the cathode, which results in in the prevention, inhibition, or minimization of transition metal dissolution at the cathode. When the ceramic HF scavenger is embedded within a cathode active material, the ceramic HF scavenger is included as an additive to the cathode active material during the fabrication of the cathode. The electrode active material 58 includes the ceramic HF scavenger at a concentration of greater than or equal to about 0.25 wt. % to less than or equal to about 10 wt. %, greater than or equal to about 0.5 wt. % to less than or equal to about 7.5 wt. %, or greater than or equal to about 1 wt. % to less than or equal to about 5 wt. %.

The current technology also provides a method of fabricating an electrode that scavenges HF, such as the electrode 56 shown in FIG. 3. The method comprises dissolving a binder in a solvent to form a binder solution comprising the binder at a concentration of greater than or equal to about 2 wt. % to less than or equal to about 10 wt. % or greater than or equal to about 4 wt. % to less than or equal to about 8 wt. %, such as at a concentration of about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %. The binder can be nonaqueous or aqueous. Non-limiting examples of nonaqueous binders include polyvinylidene fluoride (PVDF), poly(ethylene oxide) (PEO), poly(tetrafluoroethylene) (PTFE), copolymers of PTFE and perfluoro-3,6-dioxa-4-methyl-7-octene-sulfonic acid (e.g., NAFION® tetrafluoroethylene-perfluoro-3,6-dioxa-4-methyl-7-octenesulfonic acid copolymer), and combinations thereof, which are dissolvable in solvents such as N-Methyl-2-pyrrolidone (NMP), tetrahydrofuran (THF), dimethylsulfoxide (DMSO), N,N-dimethylformamide (DMF), methyl ethyl ketone (MEK), N,N-dimethylacetamide (DMAc), acetone, acetonitrile (MeCN), and combinations thereof, as non-limiting examples. Non-limiting examples of aqueous binders include sodium carboxymethyl, styrene-butadiene rubber (SBR), sodium alginate, lithium polyacrylic acid (LiPAA), sodium carboxymethylcellulose (NaCMC), and combinations thereof, which are dissolvable in solvents such as water (including distilled and deionized water), t-butanol, propanol, ethanol, methanol, ammonia, acetic acid, and combinations thereof, as non-limiting examples.

The method also comprises mixing a powder of a ceramic HF scavenger and optional additional additives into the binder solution comprising the binder dissolved in the solvent to form a slurry having a first viscosity of greater than or equal to about 100 cps to less than or equal to about 1500 cps, greater than or equal to about 200 cps to less than or equal to about 1200 cps, or greater than or equal to about 300 cps to less than or equal to about 1000 cps, such as a viscosity of about 100 cps, about 200 cps, about 300 cps, about 400 cps, about 500 cps, about 600 cps, about 700 cps, about 800 cps, about 900 cps, about 1000 cps, about 1100 cps, about 1200 cps, about 1300 cps, about 1400 cps, or about 1500 cps. The ceramic HF scavenger comprises $M_2SiO_3$, $MAlO_2$, $M_2O-Al_2O_3-SiO_2$, or combinations thereof, where M is Li, Na, or combinations thereof, as discussed above. In various embodiments, the ceramic HF scavenger is added to the binder solution until the first viscosity is achieved. The optional additional additives include, for example, electrically conductive carbons, such as carbon black, acetylene black, or carbon nanotubes.

The method then includes mixing an electrode active material into the slurry until the slurry has a new second viscosity of greater than or equal to about 2000 cps to less than or equal to about 8000 cps, greater than or equal to about 3000 cps to less than or equal to about 7000 cps, or greater than or equal to about 4000 cps to less than or equal to about 6000 cps, such as a viscosity of about 2000 cps, about 2500 cps, about 3000 cps, about 3500 cps, about 4000 cps, about 4500 cps, about 5000 cps, about 5500 cps, about 6000 cps, about 6500 cps, about 7000 cps, about 7500 cps, or about 8000 cps. In various embodiments, the electrode active material is added to the slurry at a concentration of greater than or equal to about 70 wt. % to less than or equal to about 95 wt. %, greater than or equal to about 80 wt. % to less than or equal to about 92 wt. %, or greater than or equal to about 85 wt. % to less than or equal to about 90 wt. %, such as at a concentration of about 70 wt. %, about 75 wt. %, about 80 wt. %, about 85 wt. %, about 90 wt. %, about 91 wt. %, about 92 wt. %, about 93 wt. %, about 94 wt. %, or about 95 wt. %. The electrode active material can be a cathode active material comprising a transition metal oxide or a transition metal polyanion or an anode active material.

Next, the method comprises casting a continuous layer having a thickness of $T_E$ (as described above) of the slurry onto a current collector. The casting can be performed using any method known in the art, such as by doctor blading, spin casting, or pipetting, as non-limiting examples.

The method then comprises removing the solvent from the slurry to generate the electrode that scavenges HF. The removing is performed by at least one of incubating in an oven at a temperature of greater than or equal to about 30° C. to less than or equal to about 80° C. or greater than or equal to about 60° C. to less than or equal to about 75° C. (such as a temperature of about 30° C., about 35° C., about 40° C., about 45° C., about 50° C., about 55° C., about 60° C., about 65° C., about 70° C., about 75° C., or about 80° C.) or applying a negative pressure, i.e., a vacuum. The removing is performed for greater than or equal to about 1 hour to less than or equal to about 24 hours, such as for a time of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. The resulting electrode has an electrode active material with a first porosity and that includes the ceramic HF scavenger embedded therein. The first porosity is greater than about 50% and less than or equal to about 75% or greater than about 50% and less than or equal to about 65%.

In some embodiments, the method also includes calendaring the electrode between a flat surface and a roller or between two rollers to generate a second porosity in the electrode. The second porosity is lower than the first porosity and can be greater than or equal to about 20 wt. % to less than or equal to about 50 wt. % or greater than or equal to about 35 wt. % to less than or equal to about 50 wt. %. The calendaring applies a continuous pressure of greater than or equal to about 1 Pa to less than or equal to about 10 MPa to the electrode.

The method can also include positioning the electrode within an electrochemical cell, for example, as a cathode when it includes a cathode active material. The electrochemical cell can also include an electrolyte that is capable of reacting with water to form HF.

Figure 4A:
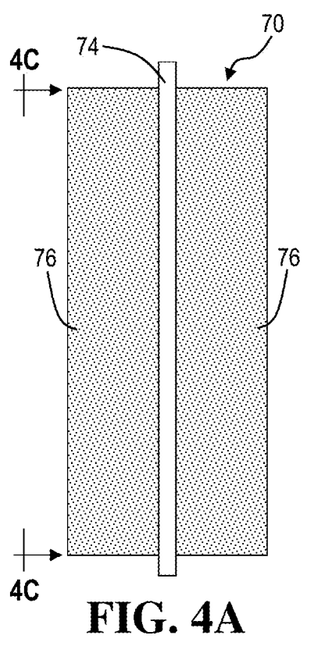
FIG. 4A is an illustration of an electrode having an electrode active material with a coating that includes a ceramic HF scavenger in accordance with various aspects of the current technology.
Figure 4B:
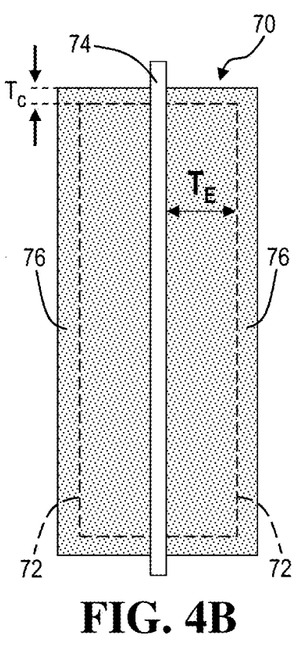
FIG. 4B is an illustration of the electrode of FIG. 4A showing an electrode active material hidden by the coating.
Figure 4C:
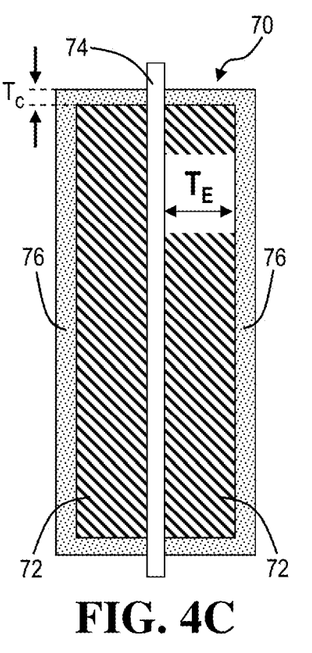
FIG. 4C is a view of the electrode of FIG. 4A after removal of a layer or plane indicated by arrows 4C, which exposes the previously hidden electrode active material.

The current technology also provides electrodes that have a coating comprising the ceramic HF scavengers. FIG. 4A shows an electrode 70, FIG. 4B shows the electrode 70 with a hidden interior portion (an electrode active material) indicated by a dashed line, and FIG. 4C is a view of the electrode 70 in FIG. 4A after removal of a layer or plane indicated by arrows 4C, which exposes the interior portion. The electrode 70 comprises an electrode active material 72 that is disposed on opposing sides of a current collector 74. The electrode active material 72 has a thickness $T_E$, as described above, and can be a cathode active material comprising a transition metal oxide or transition metal polyanion or an anode active material. The electrode 70 also includes a ceramic HF scavenger, wherein the ceramic HF scavenger comprises $M_2SiO_3$, $MAlO_2$, $M_2O-Al_2O_3-SiO_2$, or combinations thereof, where M is Li, Na, or combinations thereof (as described above), in the form of a coating 76 that coats at least a portion of the electrode active material 72. Put another way, the electrode 70 comprises a coating 76 comprising the ceramic HF scavenger, wherein the coating 76 coats or covers at least a portion of the electrode active material 72. By "at least a portion of the electrode active material" it is meant that the coating 76 completely coats the electrode active material 72 on both sides of the current collector 74, the coating 76 completely coats the electrode active material 72 on only one side of the current collector 74 (and the electrode active material on the other side of the current collector is uncoated), or the coating 76 at least partially coats the electrode active material 72 on both sides of the current collector 74, such that the coating 76 can independently be continuous or discontinuous on either side of the current collector 74.

The coating 76 has a thickness $T_C$ that is greater than or equal to about 1 µm to less than or equal to about 20 µm, greater than or equal to about 2 µm to less than or equal to about 15 µm, or greater than or equal to about 5 µm to less than or equal to about 10 µm, such as a thickness of about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, or about 20 µm. The coating 76 includes the ceramic HF scavenger at a concentration of greater than or equal to about 70 wt. % to less than or equal to about 95 wt. %, greater than or equal to about 75 wt. % to less than or equal to about 92 wt. %, or greater than or equal to about 80 wt. % to less than or equal to about 90 wt. %, such as at a concentration of about 70 wt. %, about 75 wt. %, about 80 wt. %, about 85 wt. %, about 90 wt. %, about 91 wt. %, about 92 wt. %, about 93 wt. %, about 94 wt. %, or about 95 wt. %.

In some embodiments, the electrode 70 is a cathode (i.e., the electrode active material is a transition metal oxide or transition metal polyanion), which is located within an electrochemical cell or battery that also includes an electrolyte that is capable of reacting with water to form HF. When HF is formed within the electrolyte, the ceramic HF scavenger scavenges and incorporates the hydrogen atom from the HF. The HF is then rendered incapable of reacting with transition metal oxides or transition metal polyanions in the cathode, which results in in the prevention, inhibition, or minimization of transition metal dissolution at the cathode.

In other embodiments, the electrode 70 is an anode (i.e., the electrode active material is an anode active material), which is located within an electrochemical cell or battery that also includes a cathode and an electrolyte that is capable of reacting with water to form HF. When HF is formed within the electrolyte, the ceramic HF scavenger scavenges and incorporates the hydrogen atom from the HF. The HF is then rendered incapable of reacting with transition metal oxides or transition metal polyanions in the cathode, which results in in the prevention, inhibition, or minimization of transition metal dissolution at the cathode.

Figure 5:
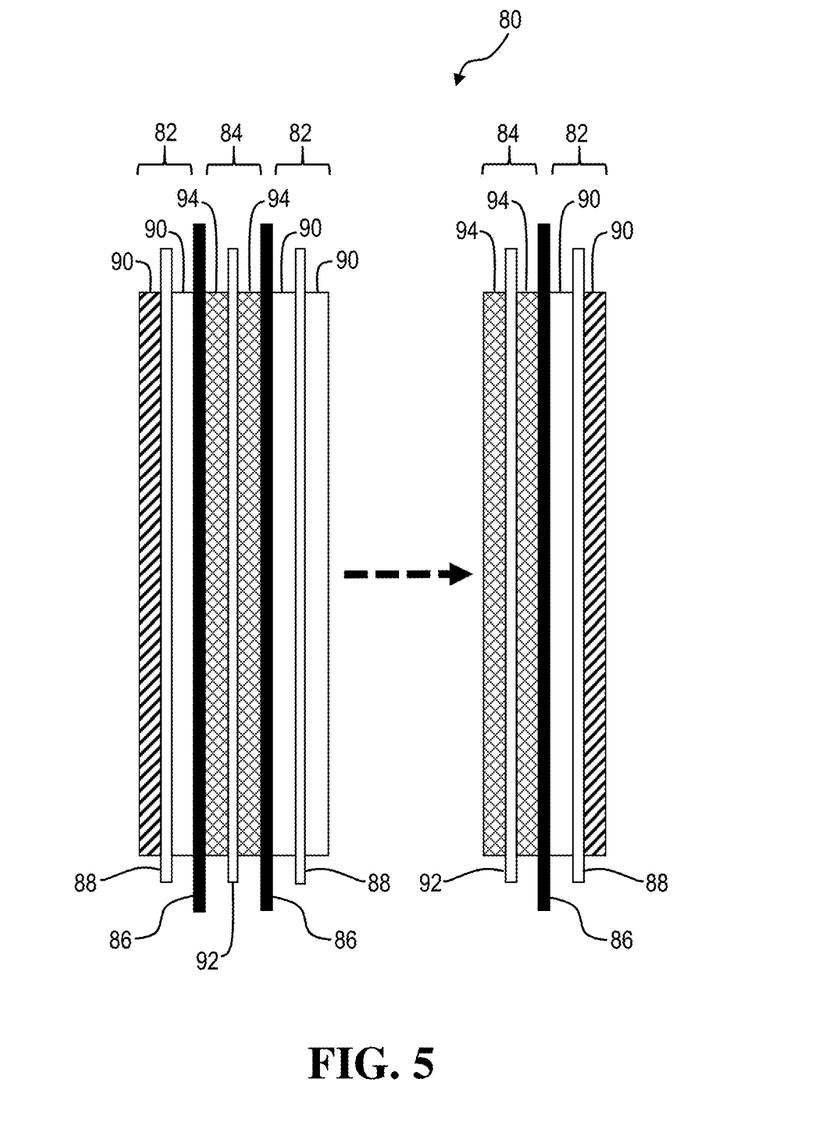
FIG. 5 is an illustration of an exemplary battery including cathodes and anodes in accordance with various aspects of the current technology.

Yet another embodiment is illustrated in FIG. 5, which shows a portion of a battery 80 comprising alternating anodes 82 and cathodes 84 separated by separators 86, with anodes 82 being at opposing ends. Each anode 82 includes an anode current collector 88 and an anode active material 90 disposed on opposing sides of the current collector. Each cathode 84 includes a cathode current collector 92 and an anode active material 94 disposed on opposing sides of the current collector. Each of the cathodes 84 comprises a cathode active material that has at least one of a ceramic HF scavenger according to the current technology embedded therein or a coating comprising the ceramic HF scavenger. In regard to the anodes 82, only the anode active materials 90 that are at the opposing ends and that are on sides of the anode current collector 88 that do not face a cathode 84 comprise at least one of a ceramic HF scavenger according to the current technology embedded therein or a coating comprising the ceramic HF scavenger.

The current technology also provides a method of fabricating an electrode that scavenges HF, such as the electrode 70 shown in FIGS. 4A-4C. The method comprises dissolving a binder in a solvent to form a binder solution comprising the binder at a concentration of greater than or equal to about 2 wt. % to less than or equal to about 10 wt. % or greater than or equal to about 4 wt. % to less than or equal to about 8 wt. %, such as at a concentration of about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %. The binder can be nonaqueous or aqueous. Non-limiting examples of nonaqueous binders include polyvinylidene fluoride (PVDF), poly(ethylene oxide) (PEO), poly(tetrafluoroethylene) (PTFE), copolymers of PTFE and perfluoro-3,6-dioxa-4-methyl-7-octenesulfonic acid (e.g., NAFION® tetrafluoroethylene-perfluoro-3,6-dioxa-4-methyl-7-octenesulfonic acid copolymer), and combinations thereof, which are dissolvable in solvents such as N-Methyl-2-pyrrolidone (NMP), tetrahydrofuran (THF), dimethylsulfoxide (DMSO), N,N-dimethylformamide (DMF), methyl ethyl ketone (MEK), N,N-dimethylacetamide (DMAc), acetone, acetonitrile (MeCN), and combinations thereof, as non-limiting examples. Non-limiting examples of aqueous binders include sodium carboxymethyl, styrene-butadiene rubber (SBR), sodium alginate, lithium polyacrylic acid (LiPAA), sodium carboxymethylcellulose (NaCMC), and combinations thereof, which are dissolvable in solvents such as water (including distilled and deionized water), t-butanol, propanol, ethanol, methanol, ammonia, acetic acid, and combinations thereof, as non-limiting examples.

The method also comprises mixing a powder of a ceramic HF scavenger into the binder solution comprising the binder dissolved in the solvent to form a slurry having a viscosity of greater than or equal to about 3000 cps to less than or equal to about 8000 cps, greater than or equal to about 4000 cps to less than or equal to about 7000 cps, or greater than or equal to about 5000 cps to less than or equal to about 6000 cps, such as a viscosity of about 3000 cps, about 3500 cps, about 4000 cps, about 4500 cps, about 5000 cps, about 5500 cps, about 6000 cps, about 6500 cps, about 7000 cps, about 7500 cps, or about 8000 cps. The concentration of the ceramic HF scavenger in the slurry is greater than or equal to about 70 wt. % to less than or equal to about 95 wt. %, greater than or equal to about 75 wt. % to less than or equal to about 92 wt. %, or greater than or equal to about 80 wt. % to less than or equal to about 90 wt. %, such as a concentration of about 70 wt. %, about 75 wt. %, about 80 wt. %, about 85 wt. %, about 90 wt. %, about 91 wt. %, about 92 wt. %, about 93 wt. %, about 94 wt. %, or about 95 wt. %. The amount of the ceramic HF scavenger can be adjusted so a suitable viscosity is achieved.

Next, the method comprises casting a continuous or discontinuous layer having a thickness of $T_C$ (as described above) of the slurry onto a surface of an electrode active material. The casting can be performed using any method known in the art, such as by doctor blading, spin casting, or pipetting, as non-limiting examples.

The method then comprises removing the solvent from the slurry to generate the electrode that scavenges HF. The removing is performed by at least one of incubating in an oven at a temperature of greater than or equal to about 30° C. to less than or equal to about 80° C. or greater than or equal to about 60° C. to less than or equal to about 75° C. (such as a temperature of about 30° C., about 35° C., about 40° C., about 45° C., about 50° C., about 55° C., about 60° C., about 65° C., about 70° C., about 75° C., or about 80° C.) or applying a negative pressure, i.e., a vacuum. The removing is performed for greater than or equal to about 1 hour to less than or equal to about 24 hours, such as for a time of about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours. The resulting electrode has a coating with a first porosity and that includes the ceramic HF scavenger embedded therein. The first porosity is greater than about 50% and less than or equal to about 75% or greater than about 50% and less than or equal to about 65%.

In some embodiments, the method also includes calendaring the electrode between a flat surface and a roller or between two rollers to generate a second porosity in the coating. The second porosity is lower than the first porosity and can be greater than or equal to about 20 wt. % to less than or equal to about 50 wt. % or greater than or equal to about 35 wt. % to less than or equal to about 50 wt. %. The calendaring applies a continuous pressure of greater than or equal to about 1 Pa to less than or equal to about 10 MPa to the electrode.

Accordingly, the current technology provides cathodes comprising a cathode active material comprising a transition metal oxide or a transition metal polyanion, wherein a ceramic HF scavenger is at least one of embedded within the cathode active material or contained within a coating that coats the cathode active material. The current technology also provides anodes comprising an anode active material, wherein a ceramic HF scavenger is at least one of embedded within the anode active material or contained within a coating that coats the anode active material. Methods for fabricating these electrodes are also provided above. The current technology also provides electrochemical cells that cycle lithium ions or sodium ions and batteries that include any combination of the cathodes and anodes, together with an electrolyte that is capable of reacting with water to form HF. As non-limiting examples, the electrochemical cells and batteries can include the cathode comprising the ceramic HF scavenger at least one of embedded within the cathode active material or contained within a coating that coats the cathode active material and an anode that does not include the ceramic HF scavenger; the cathode comprising the ceramic HF scavenger at least one of embedded within the cathode active material or contained within a coating that coats the cathode active material and an anode comprising the ceramic HF scavenger at least one of embedded within the anode active material or contained within a coating that coats the anode active material; or a cathode that does not include the ceramic HF scavenger and an anode comprising the ceramic HF scavenger at least one of embedded within the anode active material or contained within a coating that coats the anode active material.

Embodiments of the present technology are further illustrated through the following non-limiting examples.

Example 1

A cathode having $Li_2SiO_3$ embedded within a cathode active material ($Li_2MnO_4$) is fabricated according the current methods. The cathode includes 4-5 wt. % polyvinylidene fluoride (PVDF), 4-5 wt. % carbon black (C65), 1-5 wt. % $Li_2SiO_3$, and 85-90 wt. % $Li_2MnO_4$. A control cathode is prepared in the same manner, but does not include the $Li_2SiO_3$. The cathodes are incorporated into coin cells with 1 M $LiPF_6$ in ethylene carbonate (EC)/diethyl carbonate (DEC) electrolyte. The coin cell is subjected to two C/10 formation cycles and then C/3 at an elevated temperature of about 50° C. for long term tests.

Figure 6:
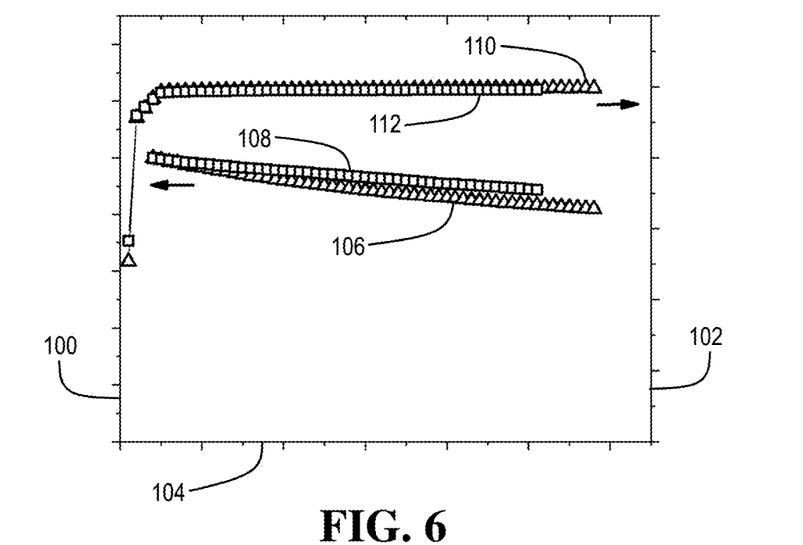
FIG. 6 is a graph showing the performance of a coin cell including an exemplary cathode having a ceramic HF scavenger embedded within a cathode active material.

Results are shown in FIG. 6, which is a graph having a first y-axis 100 representing capacity retention (from 0% to 150%), a second y-axis 102 representing coulombic efficiency (from 50% to 110%), and an x-axis 104 representing cycle number (from 0 to 65 cycles). With respect to capacity retention, triangles 106 form a curve for the coin cell including the control cathode and squares 108 form a curve for the coin cell including the cathode having the $Li_2SiO_3$ embedded within the cathode active material. These results show that the coin cell including the cathode having the $Li_2SiO_3$ embedded within the cathode active material has an improved capacity retention relative the coin cell including the control cathode. Regarding columbic efficiency, triangles 110 form a curve for the coin cell including the control cathode and squares 112 form a curve for the coin cell including the cathode having the $Li_2SiO_3$ embedded within the cathode active material. These results show that there is no loss of coulombic efficiency when $Li_2SiO_3$ is included in the cathode active material. Accordingly, the $Li_2SiO_3$ improves the high temperature cycle stability of the coin cell.

Example 2

A cathode including a LMO active material that is coated with a composition including $Li_2SiO_3$ is fabricated according the current methods. The coating includes 10-20 wt. % polyvinylidene fluoride (PVDF) and 80-90 wt. % $Li_2SiO_3$. A control cathode is prepared in the same manner, but does not include the coating. The cathodes are incorporated into coin cells with 1 M $LiPF_6$ in ethylene carbonate (EC)/diethyl carbonate (DEC) electrolyte. The coin cell is subjected to two C/10 formation cycles and then C/3 at an elevated temperature of about 50° C. for long term tests.

Figure 7:
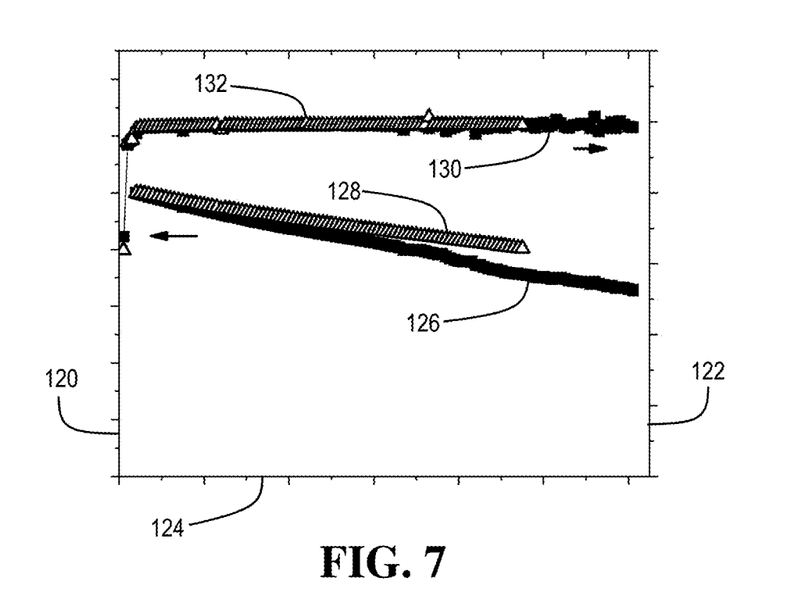
FIG. 7 is a graph showing the performance of a coin cell including an exemplary cathode having a cathode active material coated with a composition including a ceramic HF scavenger.

Results are shown in FIG. 7, which is a graph having a first y-axis 120 representing capacity retention (from 0% to 150%), a second y-axis 122 representing coulombic efficiency (from 50% to 110%), and an x-axis 124 representing cycle number (from 0 to 125 cycles). With respect to capacity retention, squares 126 form a curve for the coin cell including the control cathode and triangles 128 form a curve for the coin cell including the cathode having the $Li_2SiO_3$ coating. These results show that the coin cell including the cathode having the $Li_2SiO_3$ coating has an improved capacity retention relative the coin cell including the control cathode. Regarding columbic efficiency, squares 130 form a curve for the coin cell including the control cathode and triangles 132 form a curve for the coin cell including the cathode having the $Li_2SiO_3$ coating. These results show that there is no loss of coulombic efficiency when $Li_2SiO_3$ coats the cathode active material. Accordingly, the $Li_2SiO_3$ improves the high temperature cycle stability of the coin cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of fabricating an electrode that scavenges hydrofluoric acid (HF), the method comprising:
    mixing a ceramic hydrofluoric acid (HF) scavenger powder into a solution comprising a binder dissolved in a solvent to form a slurry having a viscosity of greater than or equal to about 5000 cps to less than or equal to about 6000 cps, the ceramic hydrofluoric acid (HF) scavenger powder comprising $M_2SiO_3$, $MAlO_2$, $M_2O$—$Al_2O_3$—$SiO_2$, or combinations thereof, where M is lithium (Li), sodium (Na), or combinations thereof;
    casting a continuous layer of the slurry onto a surface of an electrode active material layer;
    removing the solvent from the slurry to form a coating on the electrode active material layer, wherein the coating has a first porosity and scavenges hydrofluoric acid (HF).

2. The method according to claim 1, wherein the solution comprising the binder dissolved in the solvent comprises 6 wt. % polyvinylidene fluoride (PVDF) dissolved in N-Methyl-2-pyrrolidone (NMP).

3. The method according to claim 1, wherein the continuous layer of the slurry has a thickness of greater than or equal to about 1 μm to less than or equal to about 20 μm.

4. The method according to claim 1, wherein the slurry comprises the ceramic hydrofluoric acid (HF) scavenger powder at a concentration of greater than or equal to about 70 wt. % to less than or equal to about 95 wt. %.

5. The method according to claim 1, further comprising:
    calendaring the coating to generate a second porosity in the coating, the second porosity being lower than the first porosity.

6. A method of fabricating an electrode that scavenges hydrofluoric acid (HF), the method comprising:
    mixing a powder of a ceramic hydrofluoric acid (HF) scavenger into a solution comprising a binder dissolved in a solvent to form a slurry having a viscosity of greater than or equal to about 200 cps and less than or equal to about 1000 cps, the ceramic hydrofluoric acid (HF) scavenger comprising $M_2SiO_3$, $MAlO_2$, $M_2O$—$Al_2O_3$—$SiO_2$, or combinations thereof, where M is lithium (Li), sodium (Na), or combinations thereof;
    mixing a cathode active material into the slurry until the slurry has a viscosity of greater than or equal to about 4000 cps to less than or equal to about 6000 cps;
    casting a continuous layer of the slurry onto a current collector; and
    removing the solvent from the slurry to generate the electrode that scavenges hydrofluoric acid (HF), the electrode having a first porosity,
    wherein the electrode that scavenges hydrofluoric acid (HF) comprises the ceramic hydrofluoric acid (HF) scavenger embedded within the cathode active material.

7. The method according to claim 6, wherein the solution comprising the binder dissolved in the solvent comprises 6 wt. % polyvinylidene fluoride (PVDF) dissolved in N-Methyl-2-pyrrolidone (NMP).

8. The method according to claim 6, wherein the solution further comprises carbon black.

9. The method according to claim 6, wherein the slurry comprises the cathode active material at a concentration of greater than or equal to about 70 wt. % to less than or equal to about 95 wt. %.

10. The method according to claim 6, further comprising:
    calendaring the electrode to generate a second porosity in the electrode, the second porosity being lower than the first porosity.

* * * * *